United States Patent

Gleason

Patent Number: 5,410,896
Date of Patent: May 2, 1995

[54] GEAR SHIFT KNOB LOCKING DEVICE

[76] Inventor: Donald A. Gleason, 226 Douglas Rd., Lowell, Mass. 01852

[21] Appl. No.: 139,769

[22] Filed: Oct. 22, 1993

[51] Int. Cl.[6] .......................... B60R 25/06; E05G 1/10
[52] U.S. Cl. .......................... 70/202; 70/163; 70/165; 70/232; 70/246; 70/247; 70/DIG. 58; 109/29; 109/34
[58] Field of Search ................ 70/232, 201–203, 70/245–248, 209, DIG. 58, 163, 165; 109/29–34, 20, 25

[56] References Cited

U.S. PATENT DOCUMENTS

| 220,117 | 9/1879 | Belcher et al. ............... 70/18 |
| 1,484,560 | 2/1924 | Reiser ......................... 70/202 |
| 2,458,002 | 1/1949 | Kaskouras ............... 70/DIG. 58 X |
| 3,245,240 | 4/1966 | De Forrest ................. 70/232 X |
| 4,722,435 | 2/1988 | Mareels et al. ............. 109/25 X |
| 5,020,390 | 6/1991 | Chang ......................... 70/202 X |
| 5,033,280 | 7/1991 | Johnson ....................... 70/232 |
| 5,115,652 | 5/1992 | Starmer ....................... 70/209 |
| 5,125,249 | 6/1992 | Fields et al. ................ 70/202 X |
| 5,311,756 | 5/1994 | Villani ........................ 70/202 X |

FOREIGN PATENT DOCUMENTS

| 603983 | 4/1926 | France ......................... 70/202 |
| 322171 | 11/1929 | United Kingdom ......... 70/232 |
| 628058 | 8/1949 | United Kingdom ......... 70/232 |

Primary Examiner—Lloyd A. Gall

[57] ABSTRACT

A housing structure having a first shell and second shell arranged for hinged securement together and including a cooperative lock to permit latching of the first and second shells together to receive a gear shift knob within the shell when secured together preventing access to the gear shift knob release button.

1 Claim, 4 Drawing Sheets

GEAR SHIFT KNOB LOCKING DEVICE

BACKGROUND OF THE INVENTION

1. Field of the Invention

The field of invention relates to anti-theft devices for vehicles, and more particularly pertains to a new and improved gear shift knob locking device wherein the same is directed to the securement of a gear shift knob within a housing structure.

2. Description of the Prior Art

Typical vehicular gear shift levers are operated to release a vehicle from the "park" position by the typical depressing of a button in the gear shift knob.

The instant invention attempts to overcome deficiencies of the prior art by providing for a shell structure arranged to encompass the gear shift knob preventing unauthorized access to the release button and thereby preventing ease of operation of the associated motor vehicle.

Prior art anti-theft devices are exemplified by the U.S. Pat. Nos. 4,835,999; 4,693,099; 4,858,451; and 5,020,390 to Chang indicating the use of a cover structure relative to a gear shift knob.

SUMMARY OF THE INVENTION

In view of the foregoing disadvantages inherent in the known types of vehicle anti-theft apparatus now present in the prior art, the present invention provides a gear shift knob locking device wherein the same is directed to the enclosing of a gear shift knob preventing access to the release mechanism of the gear shift knob. As such, the general purpose of the present invention, which will be described subsequently in greater detail, is to provide a new and improved gear shift knob locking device which has all the advantages of the prior art gear shift knob locking apparatus and none of the disadvantages.

To attain this, the present invention provides a housing structure having a first shell and second shell arranged for hinged securement together and including a cooperative lock to permit latching of the first and second shells together to receive a gear shift knob within the shell when secured together preventing access to the gear shift knob release button.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved gear shift knob locking device which has all the advantages of the prior art gear shift knob locking apparatus and none of the disadvantages.

It is another object of the present invention to provide a new and improved gear shift knob locking device which may be easily and efficiently manufactured and marketed.

It is a further object of the present invention to provide a new and improved gear shift knob locking device which is of a durable and reliable construction.

An even further object of the present invention is to provide a new and improved gear shift knob locking device which is susceptible of a low cost of manufacture with regard to both materials and labor, and which accordingly is then susceptible of low prices of sale to the consuming public, thereby making such gear shift knob locking devices economically available to the buying public.

Still yet another object of the present invention is to provide a new and improved gear shift knob locking device which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
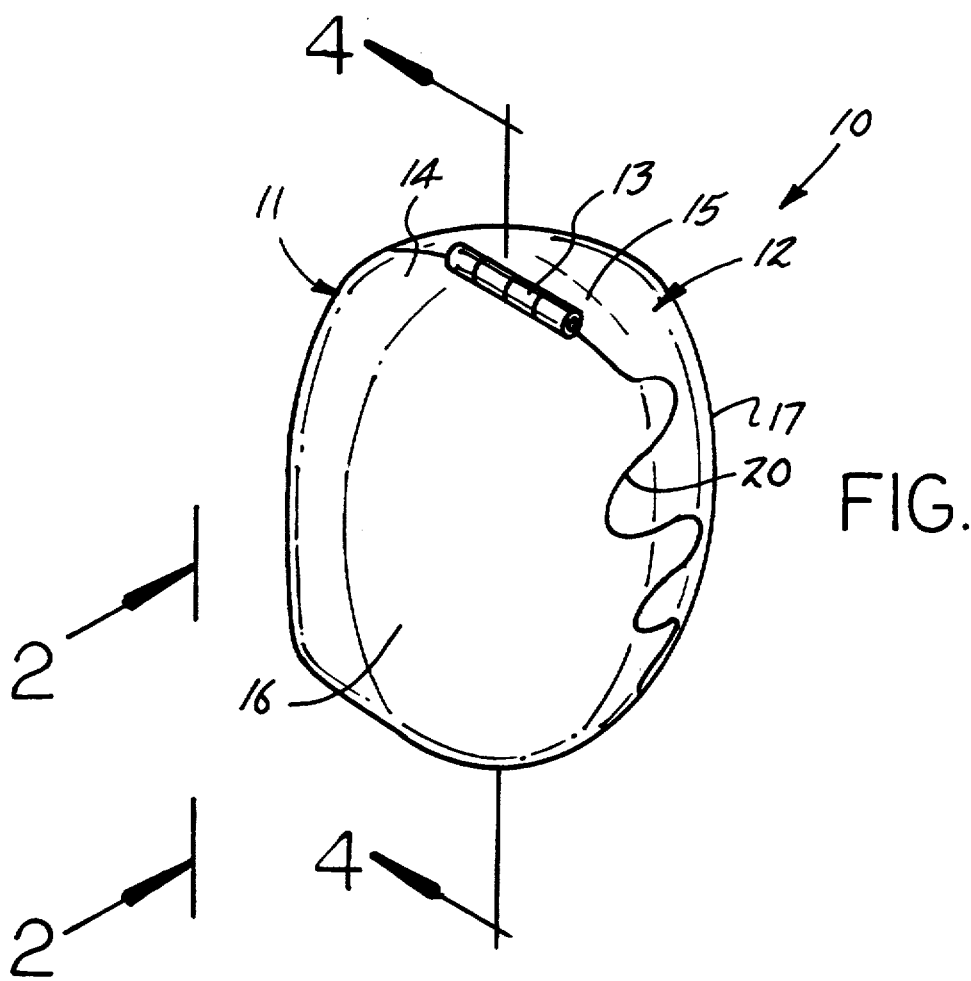
FIG. 1 is an isometric illustration of the invention.

With reference now to the drawings, and in particular to FIGS. 1 to 8 thereof, a new arid improved gear shift knob locking device embodying the principles and concepts of the present invention and generally designated by the reference numeral 10 will be described.

Figure 2:
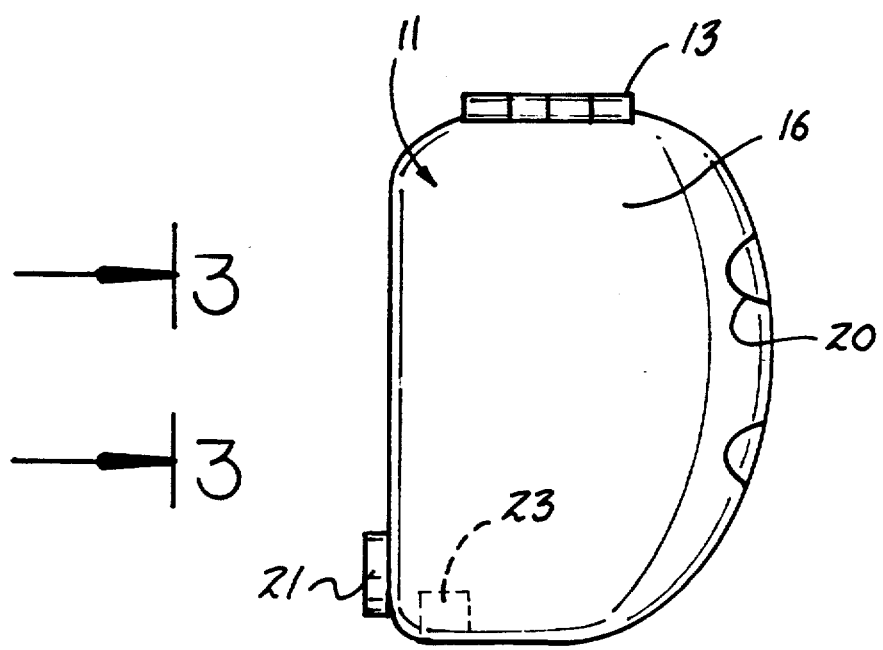
FIG. 2 is an orthographic view, taken along the lines 2—2 of FIG. 1 in the direction indicated by the arrows.
Figure 3:
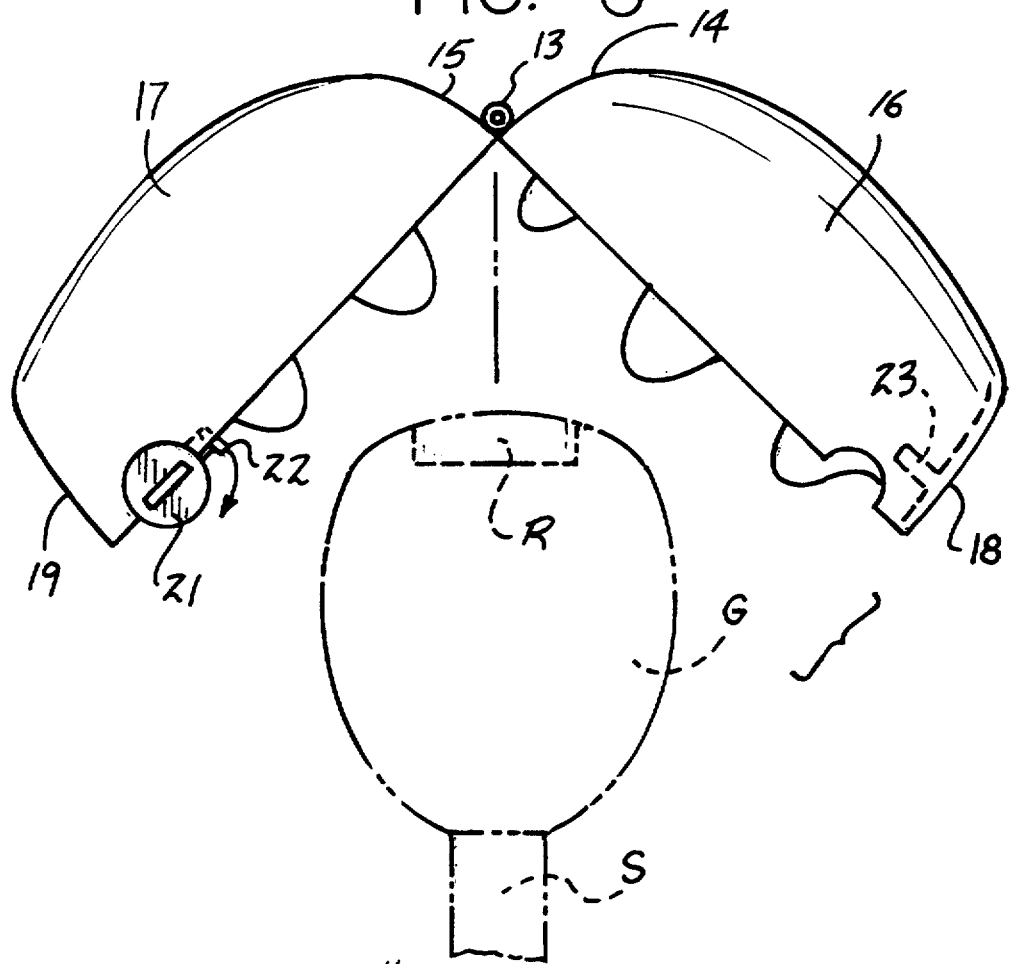
FIG. 3 is an orthographic view, taken along the lines 3—3 of FIG. 2 in the direction indicated by the arrows, indicating the housing arranged in an opened orientation to receive the gear shift knob therewithin.
Figure 4:
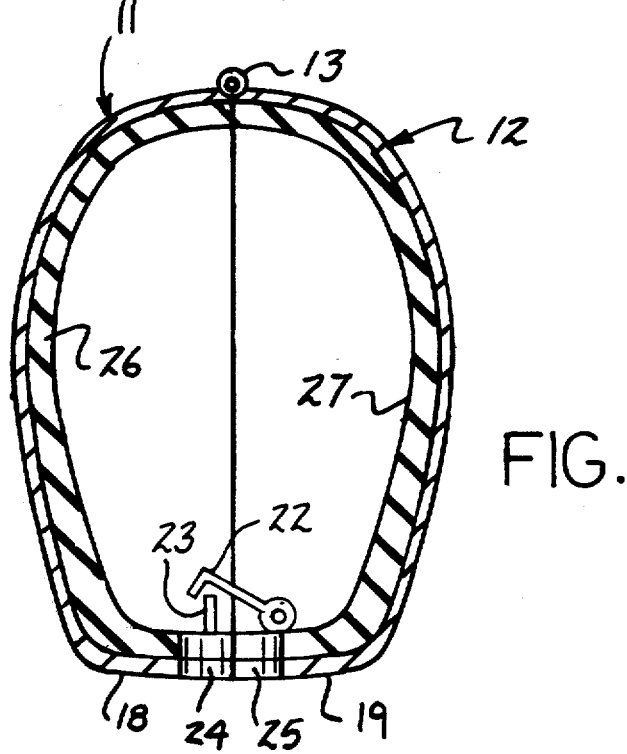
FIG. 4 is an sectional view, taken along the lines 4—4 of FIG. 1 in the direction indicated by the arrows.

More specifically, the gear shift knob locking device 10 of the instant invention essentially comprises first and second shells 11 and 12 respectively having first and second shell top wall portion 14 and 15 respectively, to include a hinge 13 mounted to the first and second shell top walls portion to pivotally mount the first and second shells 11 and 12 together. The first and second top wall portions 14 and 15 are extensions of respective first and second shell side walls 16 and 17 which are of a generally convex configuration to receive a gear shift knob "G" (see FIG. 3) within the housing structure defined when the first and second shells are secured together, in a manner as indicated in FIG. 1 for example. The first and second side walls 16 and 17 extend to respective first and second shell bottom walls 18 and 19 are arranged in a generally coplanar orientation relative to one another when the first and second shells are latched together to define a housing serpentine seam 20 to minimize tampering. The serpentine seam which extends from one end of the hinge 13 at an interface between the first and second shells 11 and 12 is directed through respective first and second front wall portions that are extension of the housing, respective first and second side walls 16 and 17 with a lock member 21 directed into a second rear wall portion of the second shell in adjacency to the second shell bottom wall (see FIGS. 2, 3, and 4). The lock member includes an L-shaped pivot latch 22 arranged for securement to a lock flange 23 fixedly mounted to the first shell bottom wall portion in adjacency to a housing first rear wall portion, such as illustrated in FIGS. 2 and 4. The linear rear seam, which extends from a second end of the hinge 13 in a facing relationship to the serpentine seam 20 such as illustrated in FIG. 4 is typically positioned in a facing relationship relative to the floor of the vehicle and is not readily accessed for tampering, with the lock member positioned into the second rear wall portion of the housing to thereby provide for relative security of the linear seam at the housing first and second rear wall portions, with the serpentine seam 20 discouraging access to the gear shift knob "G", having a shaft "S" that is received through cooperative first and second bottom wall semi-cylindrical bores 24 and 25 that are arranged concentrically relative to one another through the first and second shell bottom walls respectively when the shells are secured together in the first position, such as illustrated in FIG. 1. The first and second rear wall portions as illustrated are extensions of the respective first and second side walls 16 and 17. In this manner, the gear shift knob "G" is positioned within the latched housing and access to the release button "R" is discouraged to thereby prevent operation of the gear shift device as typically found in vehicles equipped with automatic transmissions. Further as illustrated, first and second resilient liners 26 and 27 are directed coextensively throughout the interior surface of the first and second shells 11 and 12 to minimize damage to the gear shaft knob "G".

Figure 5:
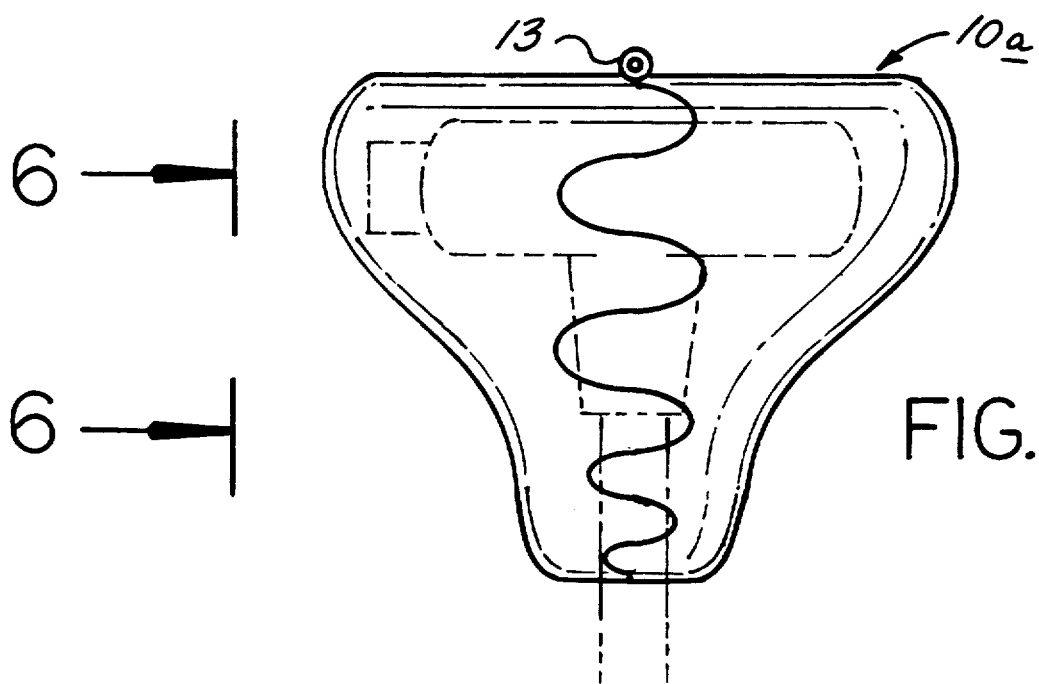
FIG. 5 is an orthographic view of a modified housing configuration.
Figure 6:
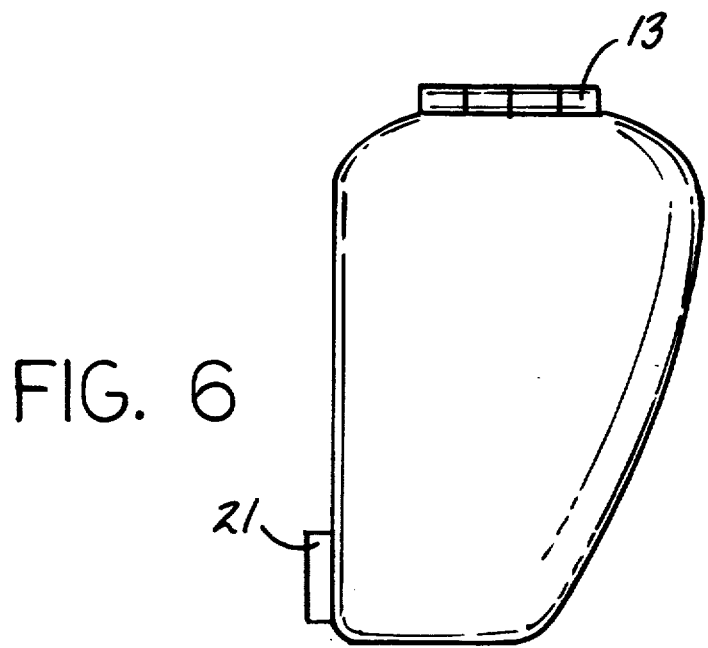
FIG. 6 is an orthographic view, taken along the lines 6—6 of FIG. 5 in the direction indicated by the arrows.

The FIGS. 5 and 6 indicate a modified device structure 10a to accommodate a T-shaped type gear shift knob.

Figure 7:
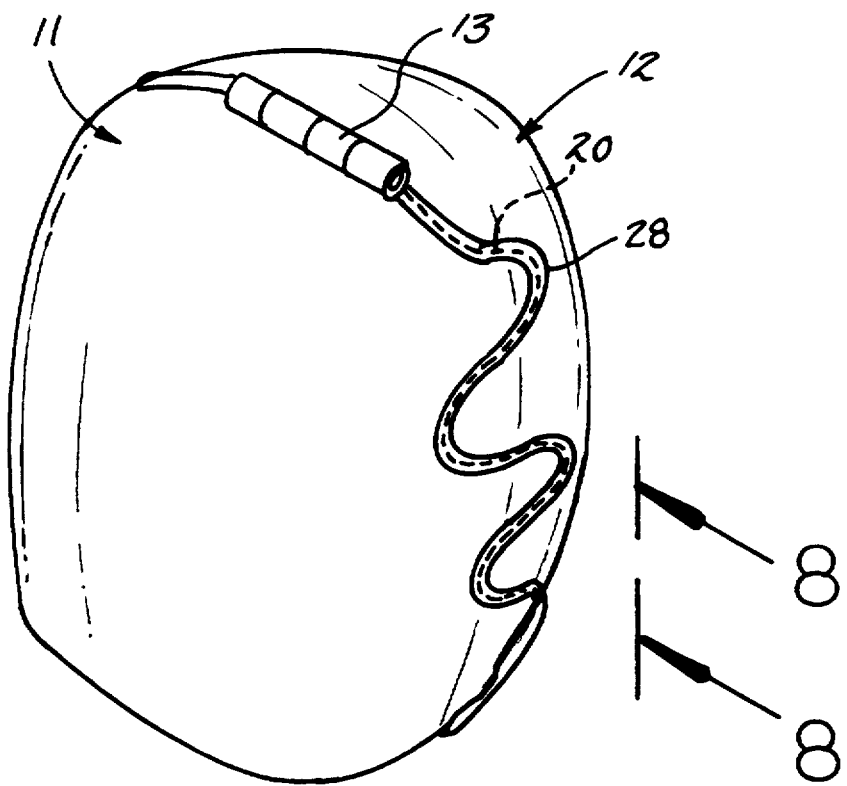
FIG. 7 is an isometric illustration of the housing further including a tampering indicator dye.
Figure 8:
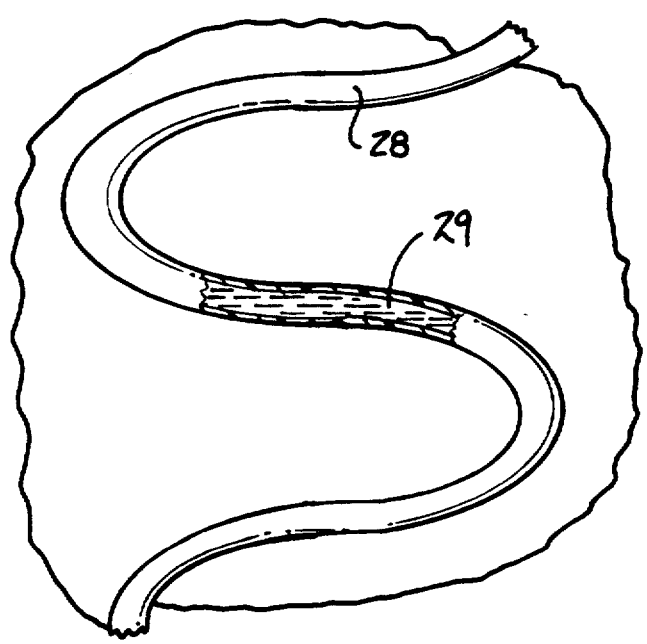
FIG. 8 is an enlarged orthographic view, partially in section, taken along the lines 8—8 of FIG. 7 in the direction indicated by the arrows.

The FIG. 7 indicates that the first and second shells 11 and 12 when secured together provide for a marking device to indicate attempt at tampering with the housing structure, such that a frangible tube 28 is mounted onto the first shell 11 for positioning over the serpentine seam 20, with the frangible tube 20 having a fluid dye 29 therewithin, such that upon rupture of the tube 28, the marking dye is indicated onto the housing structure as well as onto the hands of an individual attempting such tampering.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention.

What is claimed as being new and desired to be protected by Letters Patent of the United States is as follows:

1. A gear shift knob locking device, comprising,
a housing having a first shell and a second shell, with the first shell having a first shell top wall portion, the second shell having a second shell top wall portion, with a hinge mounted to the first shell top wall portion and the second shell top wall portion to pivotally mount the first shell relative to the second shell in a mirror image relationship, the first shell having a first shell convex arcuate first side wall extending from the first shell top wall portion, the second shell having a second shell arcuate convex second side wall extending from the second shell top wall portion, with the first shell having a first shell bottom wall portion extending from the first side wall, the second shell having a second shell bottom wall portion extending from the second wall, with the first shell bottom wall portion and the second shell bottom wall portion arranged in a contiguous relationship relative to one another when the first shell and the second shell are in contiguous relation to one another, and
the first shell having a first shell bottom wall opening, the second shell having a second bottom wall opening, with the first shell bottom wall opening and the second shell bottom wall opening arranged in a facing relationship relative to one another to receive a gear shift knob shaft therethrough when the first shell and the second shell are secured together, and lock means secured to the first shell and the second shell for selectively securing the first shell and the second shell together, the first shell having a first shell front wall portion, the second shell having a second shell front wall portion, and the first shell front wall portion and the second shell front wall portion defining a seam when the first shell and the second shell are secured together, a frangible tube directed along the seam, with the frangible tube mounted onto the first shell to extend over the seam when the first shell and the second shell are secured together, and the frangible tube includes an indicator dye contained therewith.

* * * * *